Oct. 28, 1924.     1,513,124
J. F. O'CONNOR
FRICTION SHOCK ABSORBING MECHANISM
Original Filed May 6, 1920
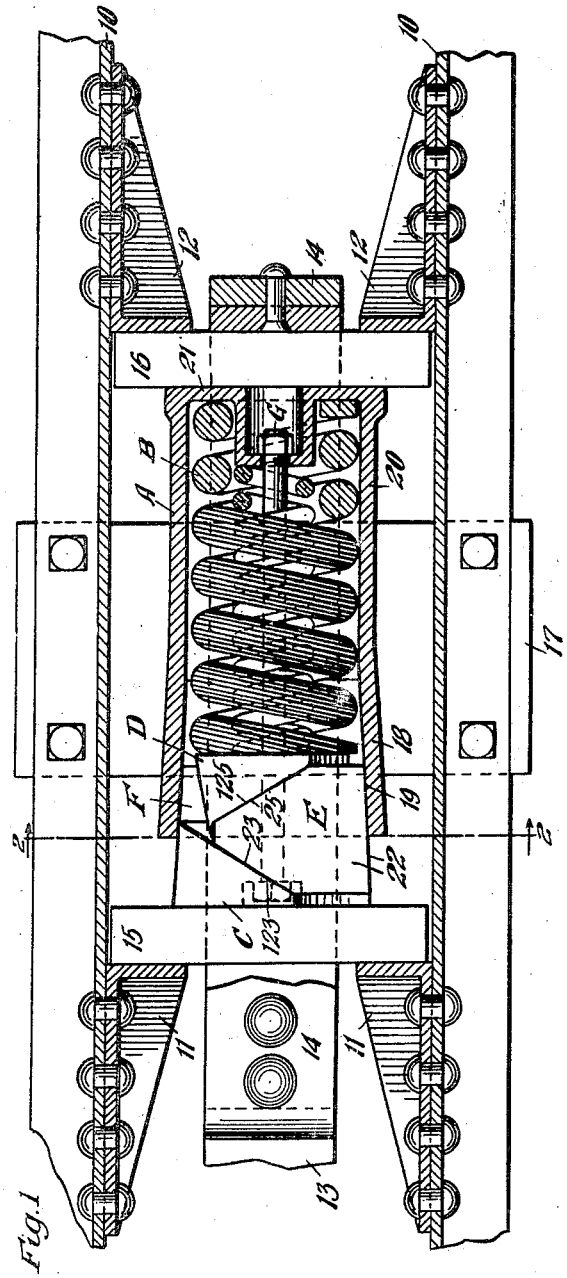
Witnesses
Wm. Geiger
Una C. Perin
Inventor
John F. O'Connor
By Geo. I. Haight
His Atty.

Patented Oct. 28, 1924.

1,513,124

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 6, 1920, Serial No. 379,326. Renewed April 17, 1922. Serial No. 553,932.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings and wherein are obtained large wearing areas and high capacity, the friction elements proper being of such character that they may be readily manufactured as castings at relatively small expense.

Another object of the invention is to provide a friction shock absorbing mechanism employing a plurality of wedges and friction shoes so combined that a differential action is obtained during the compressive stroke.

In the drawing forming a part of this specification, Figure 1 is a horizontal, longitudinal sectional view of a portion of a railway draft rigging showing my improvements in connection therewith. Figure 2 is a transverse vertical sectional view taken substantially on the line 2—2 of Figure 1. Figure 3 is a front end elevational view of the shock absorbing mechanism proper. And Figure 4 is a sectional view corresponding substantially to the line 4—4 of Figure 3.

In said drawing, 10—10 denote channel shaped center or draft sills of a railway car to the inner faces of which are secured front stop lugs 11 and rear stop lugs 12. A portion of a drawbar is indicated at 13, the same being operatively associated with the shock absorbing mechanism proper by a yoke 14 of well known form. The shock absorbing mechanism proper, hereinafter described, and front and rear followers 15 and 16, are contained within the yoke in the usual manner. A detachable saddle plate 17 may be used to support the moving parts.

The shock absorbing mechanism proper, as shown, comprises, broadly, a combined friction shell and spring cage casting A; a main spring B; an outer wedge or spreader C; an inner wedge or spreader D; and two friction shoes E and F. A retainer bolt G may also be employed to hold the parts in assembled relation.

The friction shell proper is formed at the open outer end of the casting A and preferably said shell, indicated at 18, will be of rectangular outline with four rearwardly converging flat friction surfaces 19—19. The spring cage, indicated at 20, is formed rearwardly of the shell 18 and is preferably of cylindrical contour to accommodate the single main spring B. The rear end of the casting is formed by an integral wall 21 adapted to bear against the rear follower 16.

The friction shoes E and F are diagonally disposed within the friction shell so that each shoe fits within one corner of the shell and engages two intersecting friction surfaces of the latter. For this purpose, the shoes E and F are provided with friction surfaces 22—22 which meet at substantially a right angle but which are also inclined with respect to the axis of the mechanism to correspond with the inclination of the friction surfaces 19. The friction shoe E is provided near its outer end with a friction wedge surface 23 and the shoe F is provided with a corresponding friction wedge surface 24, the planes of said surfaces 23 and 24 being parallel to a diagonal of the friction shell as shown most clearly in Figure 2.

The wedge C is formed with corresponding opposed friction wedge surfaces 123 and 124 so that the shoes are forced tightly into the corners of the friction shell.

Near its inner end, the shoe E is provided with an oppositely inclined friction wedge surface 25 and the shoe F is provided with a corresponding friction wedge surface 26. The inner wedge D is provided with opposed cooperating friction wedge surfaces 125 and 126, respectively.

The sets of friction wedge surfaces 23 and 123; and 26 and 126 extend at the same angle with respect to the axis of the mechanism and in normal position of the parts, said two sets 23 and 123 on the one hand and 26 and 126 on the other hand will extend in a common plane. The other sets of friction wedge surfaces 24 and 124; and 25 and 125 extend in planes bearing the same angular relation with respect to the axis of the mechanism but the angle of inclination of the group of surfaces 23, 123; 26 and 126 is different from that of the other group comprising the surfaces 24, 125; 25 and 125 as will be noted from an inspection of Figure 4. As shown, the surfaces 23, 123; 26 and 126 extend at a more blunt angle with respect to the axis of the shell than do the other surfaces 24, 124; 25 and 125. Because of this arrangement, there will be a differential action between all four moving elements C, D, E and F with the result that the wedge C will shift upwardly and the wedge D will shift slightly downwardly, as viewed in Figure 4, when the mechanism is compressed and to permit of these lateral or shifting movements of said members the openings 27 and 28 in the wedges C and D are enlarged, which accommodate the bolt G. With this arrangement I obtain large frictional wearing areas and consequent high capacity, all parts being readily manufactured in the form of plain castings as will be apparent from the preceeding description considered in connection with the drawing.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a friction shell having converging opposed friction surfaces; of an outer wedge; an inner wedge; a spring resistance between said inner wedge and the shell; and friction shoes cooperable with the shell and both of the wedges, the wedge surfaces of the wedges being oppositely and unsymmetrically disposed with respect to the axis of the shell, the cooperating surfaces of the shoes being correspondingly arranged.

2. In a friction shock absorbing mechanism, the combination with a friction shell having four interior inwardly converging friction surfaces, a transverse cross section of the shell corresponding substantially to that of a parallelogram; of two friction shoes diagonally disposed within the shell, each friction shoe having two outer friction surfaces cooperating with two intersecting friction surfaces of the shell; an outer wedge cooperating with the outer ends of the shoes; an inner wedge cooperating with the inner ends of the shoes, the cooperating friction wedge surfaces of the wedges and shoes being in planes so disposed that a plane bisecting the diagonally disposed angles of the shell wherein said shoes are located will be perpendicular to said cooperating friction surfaces of the shoes and wedges; and spring means for yieldingly resisting relative movement between the shell and friction elements.

3. In a friction shock absorbing mechanism, the combination with a friction shell of substantially rectangular outline in transverse section, said shell being provided on its interior with four inwardly converging friction surfaces; of an outer wedge having a pair of friction wedge surfaces on its inner side extending at different angles with respect to the axis of the shell; an inner wedge having a pair of wedge surfaces on its outer side, the same extending at different angles with respect to the axis of the shell; a pair of diagonally disposed friction shoes cooperable with the shell and said wedges; and a spring resistance interposed between said inner wedge and the shell.

4. In a friction shock absorbing mechanism, the combination with a casting having a friction shell at its outer end and a spring cage inwardly thereof, said shell being of substantially square outline in transverse section and with the interior friction surfaces converging inwardly; of an outer wedge having a pair of wedge surfaces on its inner side extending at different angles with respect to the axis of the shell; an inner wedge having a pair of wedge surfaces on its outer side extending at different angles with respect to the axis of the shell; a spring resistance interposed between said inner wedge and the inner end of the casting; and a pair of diagonally disposed friction shoes cooperable with both of said wedges, each shoe having a pair of outer friction surfaces cooperable with two intersecting friction surfaces of the shell, and two wedge surfaces extending in planes corresponding to those of the opposed wedge surfaces of the two wedges.

5. In a friction shock absorbing mechanism, the combination with a friction shell having a plurality of interior inwardly converging friction surfaces; of a spring; opposed friction shoes each having a plurality of friction surfaces, and each of the friction surfaces of said shoes cooperating with a friction surface of said shell; an outer pressure-receiving and transmitting element, said element and shoes having faces converged inwardly of the shell at different angles to the axis of the shell and engaging correspondingly inclined faces on said opposed shoes.

6. In a friction shock absorbing mechanism, the combination with a friction shell having interior friction surfaces converged inwardly of the shell; of a spring; opposed friction shoes cooperable with said surfaces; an outer pressure-receiving and transmitting element having, on its inner side, faces converged inwardly of the shell and extending at different angles with respect to the axis of the shell and cooperable with correspondingly inclined faces on said shoes; and an inner element interposed between the spring and the shoes, said inner element having outwardly converged faces extending at different angles with respect to the axis of the shell and cooperating with correspondingly inclined faces on the shoes.

7. In a friction shock absorbing mechanism, the combination with a friction shell of rectangular cross section having two sets of interior, inwardly converging friction surfaces; of a spring resistance; a pair of opposed friction wedge shoes, each of said shoes having a pair of friction surfaces, said pair of surfaces of each shoe coacting with two adjacent friction surfaces of the shell; and an outer pressure receiving and transmitting wedge element, said wedge element and shoes having coacting wedge faces increasing in width inwardly of the mechanism.

In witness that I claim the foregoing I have hereunto subscribed my name this 4th day of May, 1920.

JOHN F. O'CONNOR.

Witness:
CARRIE GAILING.